US 7,543,024 B2

(12) United States Patent
Holstege

(10) Patent No.: US 7,543,024 B2
(45) Date of Patent: Jun. 2, 2009

(54) SYSTEM AND METHOD FOR MONITORING MULTIPLE ONLINE RESOURCES IN DIFFERENT FORMATS

(75) Inventor: Mary A Holstege, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 688 days.

(21) Appl. No.: 09/848,987

(22) Filed: May 3, 2001

(65) Prior Publication Data

US 2007/0174486 A1  Jul. 26, 2007

(51) Int. Cl.
| G06F 15/16 | (2006.01) |
| G06F 17/00 | (2006.01) |
| G06F 17/20 | (2006.01) |
| G06F 17/21 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. .............. 709/206; 709/203; 709/217; 715/234; 715/235; 715/236; 715/237; 715/239

(58) Field of Classification Search ............ 709/200, 709/223–227, 202–207, 217–220; 715/513, 715/517, 234–237, 239

See application file for complete search history.

(56) References Cited

U.S. PATENT DOCUMENTS

| 5,946,697 | A | * | 8/1999 | Shen ........................... 715/513 |
| 5,978,842 | A | * | 11/1999 | Noble et al. ................. 709/218 |
| 6,094,681 | A | * | 7/2000 | Shaffer et al. ............... 709/224 |
| 6,311,187 | B1 | * | 10/2001 | Jeyaraman .................... 707/10 |
| 6,366,933 | B1 | * | 4/2002 | Ball et al. .................... 715/511 |
| 6,538,673 | B1 | * | 3/2003 | Maslov ........................ 715/853 |
| 6,631,496 | B1 | * | 10/2003 | Li et al. .................... 715/501.1 |
| 6,643,652 | B2 | * | 11/2003 | Helgeson et al. .............. 707/10 |
| 6,901,437 | B1 | * | 5/2005 | Li ............................... 709/219 |
| 2005/0114757 | A1 | * | 5/2005 | Sahota et al. ............ 715/501.1 |

OTHER PUBLICATIONS

Chapter 14 of the *XML Bible*: XSL Transformations [online]. Last modified on Oct. 17, 2000 [retrieved on Apr. 6, 2001]. Retrieved from the Internet: <URL:http://www.ibiblio.org/xml/books/bible/updates/14.html>.

* cited by examiner

*Primary Examiner*—Saleh Najjar
*Assistant Examiner*—Asad M Nawaz
(74) *Attorney, Agent, or Firm*—Townsend and Townsend and Crew LLP

(57) ABSTRACT

A system and method for monitoring multiple online resources in different formats includes a format transformer, an analytic parser, and a file comparator. The format transformer converts each monitored online resources to a strict formatted file. An analytic parser identifies relevant data within each of the strict formatted files. A comparator determines whether the relevant data has been changed by comparing it to an archived copy of the relevant data. If a change occurred, an individual is automatically notified and a database updated.

31 Claims, 3 Drawing Sheets

SYSTEM AND METHOD FOR MONITORING MULTIPLE ONLINE RESOURCES IN DIFFERENT FORMATS

BACKGROUND OF THE INVENTION

1. Field of the Invention

The present invention relates to data analysis of online applications. Specifically, the present invention relates to automated monitoring or manipulation of specific data within an online resource.

2. Description of the Background Art

The proliferation of the Internet and the presentation of data in various formats on the Internet are well known. The Internet is used to convey a variety of educational, personal, scientific, and commercial information from a large number of sources to a large number of viewers. Due to the sheer size of this information, monitoring these sources for changes or modifying data within these sources can invariably be a time consuming and daunting task.

Data may be displayed over the Internet in various formats. The most common format used is HyperText Markup Language (HTML). Oftentimes, the content within a particular web page or HTML file may vary. For example, java-based advertisement banners often appear within a single web page (e.g., search engine results), but the content within these banners is intermittently changed. Additionally, data within an online resource may frequently be updated. For example, vendors often display prices of products within a web page so that customers may quickly locate a current price on a particular product. These prices may be stored within a database, which is accessed by an online resource so that the public may view its contents. The fact that the content within web pages and other online resources is constantly changing is well known within the art.

It is very important to many individuals and companies to maintain the most current information available on the Internet. In order to maintain current data, online resources need to be monitored so that new information can be identified and, subsequently, the individual or company needs to be notified of the new information. For example, businesses that sell products need to continually monitor the costs of each component within each product that they sell. This task may require a large amount of time if a large number of products are sold or if a large number of components are contained within a single product. Other examples include the need for commodity brokers to monitor commodity prices in various markets. Currently, an individual either does this monitoring manually or software is used that compares a web page to an archived copy of the web page to determine if changes were made. However, both methods fail to target specific important information within a web page that may be changed.

Additionally, data within an online resource may need to be continually updated. For example, a supplier of a particular computer component may wish to update clients' databases regarding the cost of the component. If the supplier has a large number of clients, this updating task may be rather daunting. Typically, this process is done manually either by physically mailing out an update or emailing an update. In any event, the process requires a large amount of time.

A number of software products are available that monitor online resource for changes. According to a pre-defined schedule, a software agent fetches the resource or metadata about the resource, and performs an analysis to determine what had changed. Typically, the retrieved resource is compared to an archived copy of the resource to determine changes. However, this software is unable to specifically target and identify relevant or important data within the resource. As a result, a user was notified if any changes had occurred to the resource. This inability to identify specific data resulted in a user frequently being notified unnecessarily. For example, ad banners within a web page are changed frequently. This change would be unnecessarily reported to a user requiring the user to filter through a large number of insignificant changes in order to find the important changes.

Other software products are available that include code to specifically recognize specific content within a web page by locating the content relative to its position on the web page. For example, this software may recognize certain ad banners or header information from specific search engines because it appears above the rest of the content in the web page (i.e. at the top of the web page). However, if the layout of the web page is changed or a new type of ad banner is used, then the software heuristics must be recoded to adjust to the location changes within the web page. Because web page layouts are constantly adjusted, a large amount of work is required to continually maintain operational software heuristics that reflect the most current web page layout for each online resource that is monitored.

Non-HTML files may also want to be monitored for changes. For example, a computer manufacturer may want to monitor a database containing current prices for computer components. Software applications are currently available that may monitor specific data within a database by identifying data relative to its location within the database. However, these software applications are not generic and there is not a data-driven solution to monitor the database. Therefore, if the database is restructured, then the software heuristics must be changed.

Each of these monitoring software applications functions only within a single format. For example, an HTML monitoring software application cannot monitor databases and a database monitoring software application cannot monitor HTML based files. Therefore, an individual must purchase and maintain multiple monitoring software applications in order to monitor files that may be in different formats. Purchasing and maintaining multiple monitoring software applications is both costly and time consuming for a company or individual.

The same problems and difficulties arise when online resources must be updated remotely. Specifically, the lack of uniformity between multiple online resources makes it extremely difficult to automatically update specific data fields within each online resource because of the same problems described above. As a result, there is a need for a system and method to automatically monitor or update multiple online resources stored in different formats.

SUMMARY OF THE INVENTION

The present invention overcomes the deficiencies and limitations of the prior art by providing a system and method for automatically monitoring multiple online resources stored in different formats. In particular, the present invention provides a formatting conversion process and analytic parser that allows a user to specifically identify data within a web page and either monitor the identified data for changes or update the identified data.

According to the present invention, all online resources that will be monitored or updated are converted to a common format. This common format provides a strict representation of the data within the web page. For example, a format frequently used today that requires a strict representation of data within the file's format is Extensible Markup Language (XML). By converting all online resources to this common XML format, particular data from each file may be identified and then analyzed by a particular data script. Comparatively, if the online resources were not first converted to this common format then the analysis of the online resource becomes more difficult. Specifically, a change to the content or data architecture of the online resource may prevent a data script from recognizing or misidentifying relevant data necessary for proper analysis. However, by providing a common, strict formatted copy of each online resource, a particular script may be used to analyze multiple versions of the same online resource.

In order to transform each online resource into this common strict formatted copy, a transformer may be required. Generally, a transformer is used to convert a first format to a second format. For example, a format that may be employed by the present invention is Extensible Style Language Tranformer (XSLT). XSLT may be used to convert an HTML format to an XML format. The common strict view of online resources and corresponding transforms is not limited to XML and XSLT applications.

A Document Object Model (DOM) is an application program interface (API) that may be used as a common representation of multiple versions of an online resource. Like XML, a DOM representation provides a strict architectural representation of the data that allows a program to accurately identify content within the online resource.

An analytic parser is used on a common strict formatted file (e.g., XML and DOM) to identify relevant data within the file. Typically, an analytic parser is a program that uses data flags or identifiers within common strict formatted file to identify the relevant data. For example, the script may use a specific row flag within the converted file to identify a particular piece of relevant data. This particular piece of data is then compared to an archived copy of the file or the file metadata to determine if any changes have occurred. If a change occurred, a user is notified or a database is updated reflecting the change. As a result, the time required to maintain current data is greatly reduced due to this automated format-generic monitoring system and method.

BRIEF DESCRIPTION OF THE DRAWINGS

The invention is illustrated by way of example and not by way of limitation in the figures of the accompanying drawings in which like reference numerals refer to similar elements.

DETAILED DESCRIPTION OF THE PREFERRED EMBODIMENTS

A system and method for monitoring multiple files in disparate formats is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

A first aspect of the present invention relates to a method associated with physical quantities and acts. Unless specifically stated otherwise as apparent from the following discussion, it is appreciated that throughout the description, discussions utilizing terms such as "processing" or "converting" or "identifying" or "determining" or "updating" or the like, refer to the action and processes of a computer system, or similar electronic device, that manipulates and transforms data represented as physical (electronic) quantities within the computer system's registers and memories into other data similarly represented as physical quantities within the computer system's memories or registers or other such information storage, transmission or display devices.

The present invention also relates to a system that performs the operations herein. This system may be specifically constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical discs, read-only memories (ROMs), random access memories (RAMs), EPROMs, EEPROMs, magnetic or optical cards, or any type of media suitable for storing electronic instructions, and each coupled to a computer system bus.

The present invention is not described with reference to any particular programming language. It will be appreciated that a variety of programming languages may be used to implement the teachings of the invention as described herein.

The present invention allows a company or business to automatically monitor changes to any online resource irrespective of the format in which the online resource is saved. The present invention converts all online resources to a common format and identifies relevant data within the converted data. The identified relevant data is compared to an archived copy to determine whether a change has occurred. An individual may be notified or a database updated if a change is detected.

Figure 1:
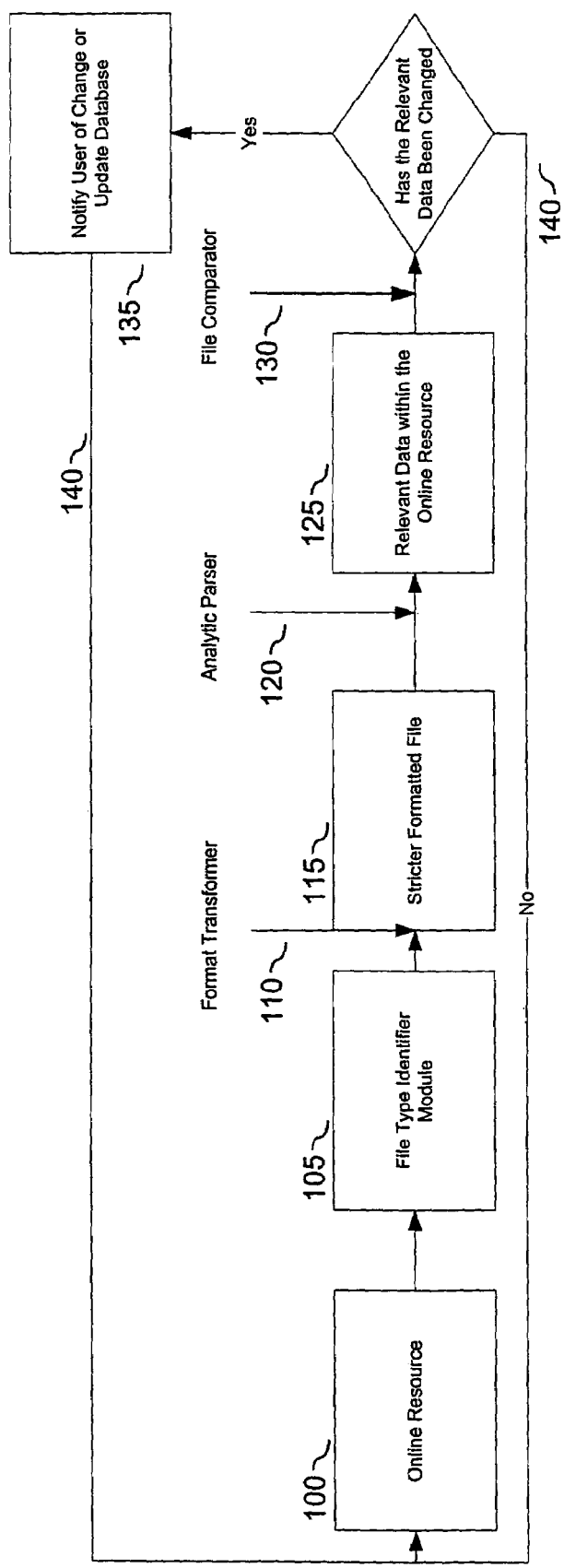
FIG. 1 is a general block diagram showing modules within the present invention system.

FIG. 1 shows a general block diagram of the present invention. According to the present invention, a particular online resource is identified 100 and specific data is analyzed within the online resource. A file type identifier module 105 determines the format for each online source 100 that will be monitored. Although most web pages are formatted as HTML files, there is not a uniform architectural data structure in which content on the web page is stored. As a result, a file type identifier module 105 determines the type of format and corresponding architectural data structure of the online source prior to analyzing particular data within the online source.

A format transformer 110 converts the initial format of the online resource 100 to a common strict formatted copy 115. Typically, this copy is a common XML view of the online resource version. The format transformer 110 is used to convert files between different formats. For example, a common format transformer 110 that may be used in the present invention is an XSLT. An XSLT can be used to convert an HTML formatted file to an XML formatted file. By converting all online resource versions to this common XML format, particular data from each file may be identified and then analyzed by a particular data script or program. Comparatively, if the online resources were not first converted to this common format then the analysis of the online resource becomes more difficult. Specifically, a change to the content or data architecture of the online resource may prevent a data script from recognizing or misidentifying relevant data necessary for proper analysis. However, by providing a common, strict formatted copy of each online resource, a particular script may be used to analyze multiple versions of the same online resource.

A Document Object Model (DOM) is an application program interface (API) that may be used as a common representation of multiple versions of an online resource. Like XML, a DOM representation provides a strict architectural representation of the data that allows a program to accurately identify content within the online resource. A DOM may be generated by a transform such as XSLT or generated by other software that will create a DOM from an existing HTML source code. After a DOM has been created, it may be converted to a common strict XML view of the online resource or particular data may be identified and analyzed directly from the DOM.

The need for a common strict format for each version of the online resource is described in more detail below in relation to HTML file structure. HTML code incorporates data content, data characteristics (e.g. font, color, and size), and data position. The HTML format allows various arrangements of identifiers or flags within the body of an HTML source code. Typically, these flags define how content will be displayed (e.g. size) or where the content will be located within the web page. However, HTML does not require a strict architectural structure for these identifiers. It is very common for HTML source code to use inconsistent identifier structure within a single web page and for these identifiers not to be symmetrical around data between the identifiers. Additionally, these architectural inconsistencies are even more apparent when a large number of different HTML source code files are analyzed. As a result of a lack of strict content architecture within the HTML format, it is difficult to locate specific data within HTML source code by using general HTML identifiers or flags. Comparatively, the strict formatted files 115 require a much more consistent structure of content identifiers and flags. As a result, it easier to locate specific data within the code of these strict formatted files because the data identifiers are easily located within the format structure.

An analytic parser 120 identifies relevant data within the strict formatted file 115. Typically, an analytic parser is a program created to use a data identifier or flag to locate relevant data found within the online resource 125. For example, the analytic parser may be used to identify particular computer component data within a web page. After a version of the web page is converted to a common strict formatted copy, the analytic parser may search it for a specific identifier or flag identifying the particular computer component. From this identifier or flag, the analytic parser identifies a price for that particular computer component. The strict structure and common view 115 for each version of the online resource greatly reduces the error in identifying the component's price after finding the corresponding row header.

Once relevant data has been identified within a common strict formatted view of an online resource, an analysis or manipulation may be performed on that particular data. This analysis or manipulation may include a wide range of actions including looking for changes in or remotely updating the data.

According to the present invention, a first possible data analysis would be tracking the relevant data for changes. A file comparator 130 compares the identified relevant data 125 to the most recent archived copy of the relevant data. If there are any differences between identified relevant data and the archived copy, then relevant material changes to the online resource were made since the last time this procedure was done. Thereafter, a company or individual may be automatically notified of the changes or a database monitoring the online resource may be updated 135. The online resource is continually monitored by reinstating the process 140 after a pre-determined period of time or any other event that may trigger the process. As a result, an individual is not required to actively participate in the monitoring process or filter through a large number of insignificant changes to online resources.

The file comparator 130 may also compare the strict formatted file or identified relevant data 125 to a corresponding archived copy of the file's metadata. For example, a hash may be generated and stored for each copy of a particular file or piece of data in the file. The file comparator 130 may then generate a hash from the most recent strict formatted file or identified relevant data and compare it with an archived hash. As a result, the file comparator 130 is able to compare multiple files by using a hash representation of the file itself or data within the file.

In addition to monitoring data for changes, data may be remotely updated as a result of this common strict formatted view of an online resource. For example, a vendor may want to remotely update each of his/her customer's database regarding the price of a particular product. Typically, this would be done by either physically mailing a price update, sending out an email or telephoning each customer regarding the update. In any event, this process requires a substantial amount of time for both the vendor and the customer. However, according to the present invention, once relevant data has been identified in an online resource (e.g. customer database), the relevant data can be automatically updated by running a particular script. It is apparent to those skilled in the art that there are numerous applications that may be applied to relevant data once it has been identified within an online resource.

Figure 2:
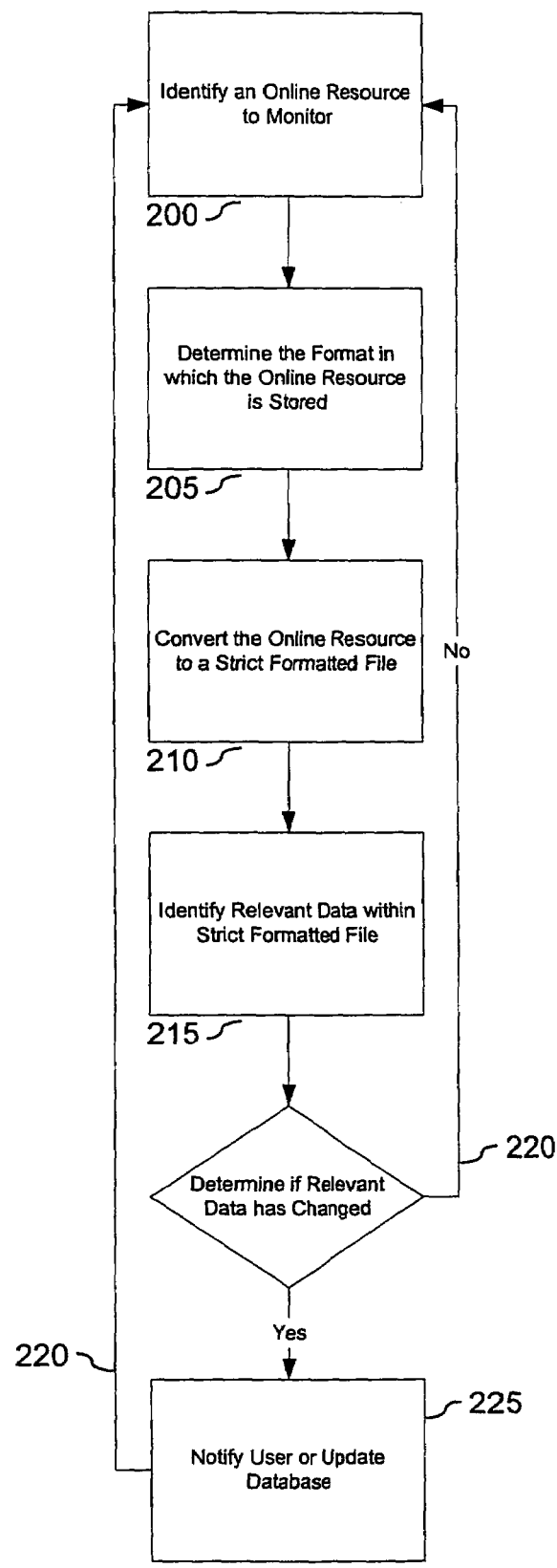
FIG. 2 is a general flow diagram showing steps within the present invention method.

FIG. 2 shows a general flow diagram describing a method for monitoring multiple online resources stored in different formats. Each online resource is identified 100 for monitoring or updating of changes to relevant data contained therein. Typically, a programmer would include the location of the online resource within a program that will monitor or update it. However, online resources may also be identified by analyzing a large number of different files against a set of criteria and selecting the files that satisfy the set of criteria.

After an online resource is selected, the format in which the online source is stored and its corresponding content architecture is determined 205. As previously discussed, the requirements of HTML on the actual architecture of content within source code is not strict or uniform. As a result, it is important that this information is gathered in order to ensure that a subsequent format conversion process operates correctly.

A current version of the online resource is converted to a strict formatted file 210 corresponding to a common view of each version of the online resource. As described above, the common strict formatted file may be an XML file. Additionally, a DOM of the online resource may be used as a common view of the online resource or implemented in the conversion of the online resource to another common strict formatted file (e.g. XML). For example, using a transformer, an HTML version of the online resource is converted to an XML file. A well-shown transformer that performs this conversion is XSLT. However, if the HTML file lacks sufficient structure, then an XSLT may not function properly. In this case, a DOM may be created of the HTML file either manually or through software used specifically to generate DOMs from source code. After a DOM is created, the DOM may be used to generate an XML version of the HTML file or may be used as a common view of the online resource itself. In any event, a common strict view of the online resource is now available on which a program may operate to identify relevant data within the online resource.

An analytic parser identifies specific data that will be monitored within the strict formatted file 215. Typically, an analytic parser is a small program or script that uses the file structure or format to identify specific data within the file. The analytic parser may operate specifically on a single file having multiple versions or may operate on a large number of files sharing a common architecture. After the analytic parser has identified the relevant data, a number of different manipulations or monitoring operations may be performed.

A first monitoring operation that may be performed on the identified relevant data is monitoring it for changes. A program data comparator may be used to determine whether the relevant data has been changed. Generally, this determination is done by comparing the relevant data from the strict formatted file to the most recent archived copy of the relevant data. A simpler process incorporates a comparison of the content metadata from each version of the online resource. However, this comparison will identify if a change occurred but not be able to specifically target the actual change.

A change is identified when the relevant data from the strict formatted file does not exactly match the archived copy or archived copy of the file metadata. In such an instance, the retrieved data is archived and an individual or company may be automatically notified that a change was found 225. Additionally, a database monitoring the online resource may be updated 225. Thereafter, the process may be reinitiated 220. Typically, the passing of a pre-determined time period may trigger the process; however, any event may be used as a trigger.

As discussed above, comparing copies of each file's metadata may monitor the files. Specifically, hashes generated from each file may be compared instead of piece-by-piece comparison. Although this type of comparison will not identify what has been changed, it provides a much more efficient method of determining if a file has changed.

According to the present invention, a second operation may be performed on the identified data. This second operation allows data within a web page to be automatically updated remotely. For example, a program running on a remote terminal may update an online database. The accuracy of the update is increased by the fact that a common strict formatted view of the database is first updated and then converted back to its original format. As a result, a large number of different databases may be updated with the same material or a single database may be updated with a large number of different updates.

Figure 3:
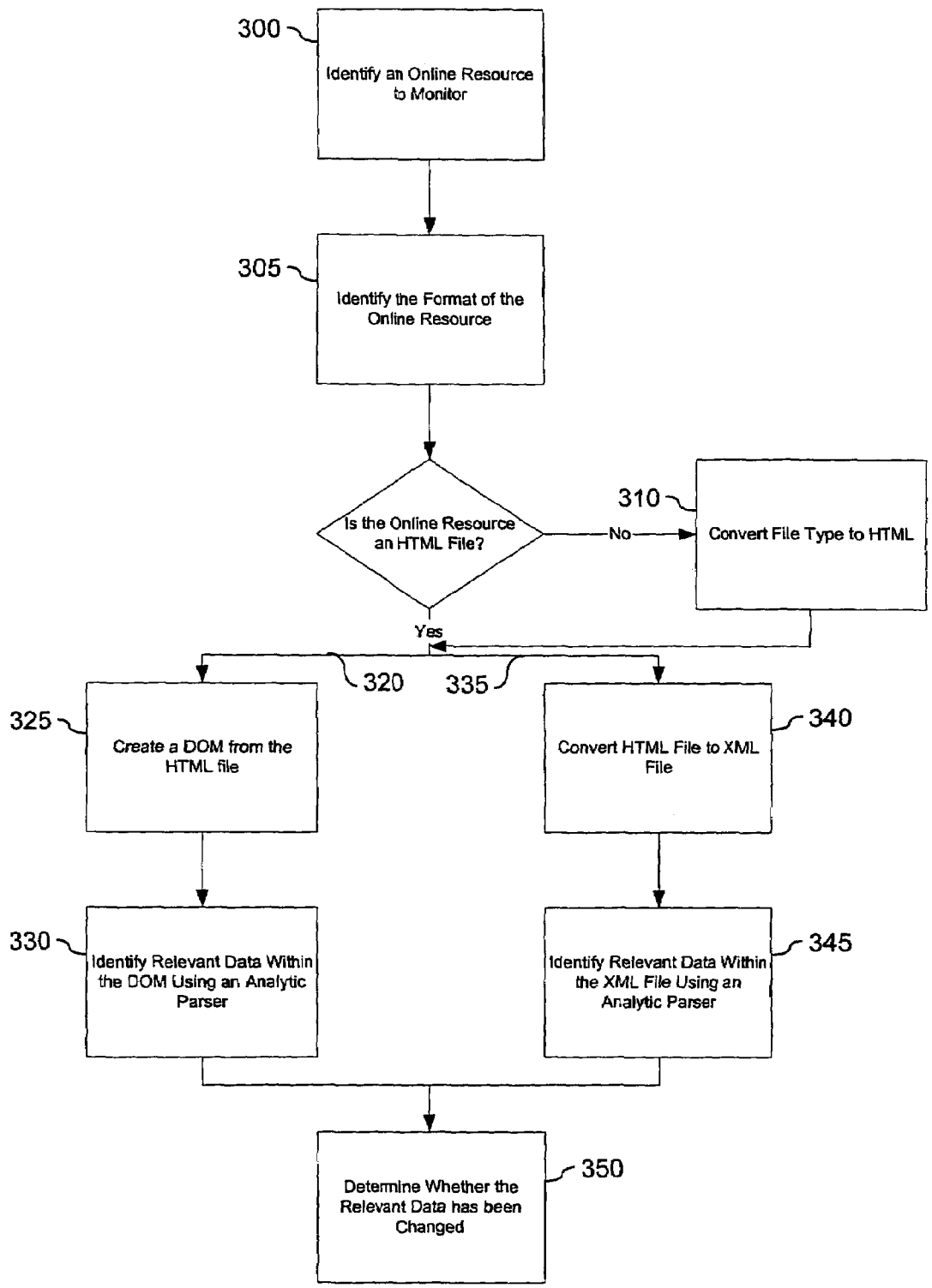
FIG. 3 is a specific flow diagram showing multiple methods according to the present invention.

FIG. 3 shows a more detailed flow chart of a process for monitoring online resources for relevant changes. As shown in FIG. 3, an online resource is targeted for monitoring 300 and its corresponding format and content structure is identified 305. If the online resource is not an HTML file, then it is converted to an HTML file 310. This conversion is common and conversion files are typically embedded within browsers that convert various formats to HTML. For example, a Microsoft Word™ file may be converted to an HTML file by simply importing the Word™ file into a browser window. The online resource is initially converted into an HTML file to facilitate the use of XSLT to convert the HTML file to an XML file. XSLT is a common format transform that is used to convert well-formed HTML files to XML files and vice versa. However, as described above, the HTML file must have a minimum level of content structure in order for XSLT to properly function. Typically, this requires that content identifiers and flags meet a certain architectural standard within the code of the HTML file.

If an XSL Transform can properly convert the HTML file to an XML file, then a first format conversion method is used 335. As described above, if the HTML is sufficiently well-formed, then the HTML file is converted to an XML file using an XSLT 340. An analytic parser identifies relevant data within the XML file by using data identifiers within the XML code 345. Thereafter, the identified data is compared to a most recent archived copy of the same data to determine if any changes have occurred 350. If changes have occurred, then the identified data is archived and a business or individual is notified. Additionally, a database monitoring the online resource may be updated to reflect the change.

A second conversion method 320 may be used when the HTML file lacks sufficient content structure to allow an XSL Transform to occur. According to this second method, a DOM is created from the HTML file 325 either manually or by available software. A DOM is a platform neutral object model of a web page or HTML file. Specifically, a DOM shows the content and its structure within HTML source code. This representation, like an XML file, is easily parsable and facilitates the identification of specific data within the entire file. The conversion from an HTML file to a DOM may be done manually by a programmer or performed by a small program or computer script specific to a particular format. Additionally, a DOM may be used to generate an XML file. Therefore, if a common view of an online resource is an XML file, then the DOM would be used to create an XML view of the particular version of the online resource.

An analytic parser identifies relevant data within the DOM or subsequent XML file by using data identifiers embedded in the DOM structure 330 or XML source code. Thereafter, the identified data is compared to a most recent archived copy of the same data to determine if any changes have occurred 350. If changes have occurred, then the identified data is archived and a business or individual is notified. An alternative comparison is simply comparing the metadata from the different versions as described above. Additionally, a database monitoring the online resource may be updated to reflect the change.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A method for monitoring multiple online resources in different formats, the method comprising the steps of:
   identifying a plurality of online resources to monitor, the plurality of online resources being stored in a plurality of formats, at least one of the plurality of online resources including data in a non-strict architectural structure;
   identifying whether each of the online resources of the plurality of online resources is a non-HyperText Markup Language application;
   for each of the plurality of online resources from the non-HyperText Markup Language application, converting the online resource from the non-HyperText Markup Language application to a HyperText Markup Language application;
   for each of the online resources of the plurality of online resources, determining whether the online resource meets a minimum level of content structure to allow an Extensible Style Sheet Transform to be used to convert the online resource to the strict formatted file;
   converting each of the plurality of online resources that is determined as meeting the minimum level of content structure to a strict formatted file having a common format, wherein the strict formatted file is an Extensible Markup Language application, and wherein data in the plurality of formats of the plurality of online resources is converted into a strict architectural structure;

converting each of the plurality of online resources that is determined as not meeting the minimum level of content structure to a strict formatted file, wherein the strict formatted file is a document object model of the online resource;

after converting to the strict formatted file, identifying relevant data in each of the strict formatted files based on the strict architectural structure of the data using an analytic parser; and comparing the identified relevant data to a most recent archived copy of the identified relevant data to determine whether the identified relevant data has been altered.

2. The method of claim 1 wherein at least one of the online resources is a HyperText Markup Language application.

3. The method of claim 1 wherein at least one of the online resources is a non-HyperText Markup Language application.

4. The method of claim 3, wherein converting the online resource to the strict formatted file comprises converting the HyperText Markup Language application to the strict formatted file.

5. The method of claim 1 wherein an Extensible Style Sheet Transform is used to convert each online resource to the strict formatted file.

6. The method of claim 1 wherein the strict formatted file is an Extensible HyperText Markup Language application.

7. The method of claim 1 wherein each strict formatted file is a document object model of one of the online resources.

8. The method of claim 1 wherein the analytic parser is a script that operates on the strict formatted file.

9. The method of claim 8 wherein the script identifies relevant data via markers within the strict formatted file.

10. The method of claim 1 further comprising the step of storing the identified relevant data within a database.

11. The method of claim 1 further comprising the step of automatically notifying a user when the identified relevant data has changed.

12. The method of claim 1 further comprising the step of automatically updating a database.

13. The method of claim 1, wherein identifying relevant data in the strict formatted file comprises identifying data flags or identifiers in the strict architectural structure to identify the relevant data.

14. A computer-implemented system for monitoring multiple files in disparate formats, the system comprising:

a file type identifier module adapted to identify the format of each of a plurality of online resources, at least one of the online resources being in a first format including data in a non-strict architectural structure;

a format conversion module adapted to,
identify whether each of the online resources of the plurality of online resources is a non-HyperText Markup Language application,
for each of the plurality of online resources from the non-HyperText Markup Language application, convert the online resource from the non-HyperText Markup Language application to a HyperText Markup Language application,
for each of the online resources of the plurality of online resources, determine whether the online resource meets a minimum level of content structure to allow an Extensible Style Sheet Transform to be used to convert the online resource to the strict formatted file, convert each of the online resources that is determined as meeting the minimum level of content structure to a strict formatted file having a common format, wherein the strict formatted file is an Extensible Markup Language application, and wherein data in the format of each online resource is converted to a strict architectural structure, and
convert each of the online resources that is determined as not meeting the minimum level of content structure to a strict formatted file, wherein the strict formatted file is a document object model of the online resource;

after conversion to the strict formatted file, an analytic parser adapted to identify relevant data in the strict architectural structure in each strict formatted file;

a resource filter adapted to determine whether the identified relevant data has been altered by comparing the identified relevant data in at least one of the strict formatted files to a most recent archived copy of the identified relevant data.

15. The system of claim 14 wherein at least one of the online resources is a HyperText Markup Language application.

16. The system of claim 14 wherein at least one of the online resources is a non-HyperText Markup Language application.

17. The system of claim 16, wherein the format conversion module is adapted to convert the online resource to the strict formatted file by converting the HyperText Markup Language application to the strict formatted file.

18. The system of claim 14 wherein an Extensible Style Sheet Transform is used to convert each online resource to the strict formatted file.

19. The system of claim 14 wherein the strict formatted file is an Extensible HyperText Markup Language application.

20. The system of claim 14 wherein the strict formatted file is a document object model of the online resource.

21. The system of claim 14 wherein the analytic parser is a script that operates on the strict formatted file.

22. The system of claim 21 wherein the script identifies relevant data via markers within the strict formatted file.

23. The system of claim 14 wherein the identified relevant data is stored within a database.

24. The system of claim 14 further comprising a monitoring module adapted to automatically notify a user when the identified relevant data has changed.

25. The system of claim 14 further comprising a monitoring module adapted to automatically update a database when the identified relevant data has changed.

26. The system of claim 14, wherein the analytic parser is adapted to identify data flags or identifiers in the strict architectural structure to identify the relevant data.

27. A method for monitoring multiple online resources in different formats, the method comprising the steps of:

identifying a plurality of online resources to monitor, the online resources being stored in a plurality of formats, at least one online resource includes a database and includes data in a non-strict architectural structure;

identifying whether each of the online resources of the plurality of online resources is a non-HyperText Markup Language application;

for each of the plurality of online resources from the non-HyperText Markup Language application, converting the online resource from the non-HyperText Markup Language application to a HyperText Markup Language application;

for each of the online resources of the plurality of online resources, determining whether the online resource meets a minimum level of content structure to allow an Extensible Style Sheet Transform to be used to convert the online resource to the strict formatted file;

converting each online resource that is determined as meeting the minimum level of content structure to a strict formatted file having a common format, wherein the strict formatted file is an Extensible Markup Language application, and wherein data in the online resource in the non-strict architectural structure is converted into a strict architectural structure;

after converting to the strict formatted file, identifying relevant data in each of the strict formatted files based on the strict architectural structure using an analytic parser;

remotely updating the relevant data in the database online resource by using a script which updates the relevant data in at least one of the strict formatted files converted from the database online resource and by converting the at least one strict formatted file to an original format of the database online resource.

28. The method of claim 27, wherein identifying relevant data in the strict formatted file comprises identifying data flags or identifiers in the strict architectural structure to identify the relevant data.

29. A computer-implemented system for monitoring multiple files in disparate formats, the system comprising:

a file type identifier module adapted to identify the format of each of a plurality of online resources having a plurality of formats, at least one online resource including data in a non-strict architectural structure;

a format conversion module adapted to
identify whether each online resource is a non-HyperText Markup Language application,
for each online resource from the non-HyperText Markup Language application, convert the online resource from the non-HyperText Markup Language application to a HyperText Markup Language application,
for each online resource, determine whether the online resource meets a minimum level of content structure to allow an Extensible Style Sheet Transform to be used to convert the online resource to the strict formatted file,
convert each online resource that is determined as meeting the minimum level of content structure to a strict formatted file having a common format, wherein the strict formatted file is an Extensible Markup Language application, and wherein data of the online resource in the non-strict architectural structure is converted into a strict architectural structure,
convert each online resource that is determined as not meeting the minimum level of content structure to a strict formatted file, wherein the strict formatted file is a document object model of the online resource;

after conversion to the strict formatted file, an analytic parser adapted to identify relevant data in each strict architectural structure in the strict formatted file; and a resource updater to update the identified relevant data in a database.

30. The system of claim 29, wherein the analytic parser is adapted to identify data flags or identifiers in the strict architectural structure to identify the relevant data.

31. A method for monitoring multiple online resources in different formats, the method comprising the steps of:

identifying a plurality of online resources to monitor, at least one resource of the plurality of online resources being stored in a first format including data in a non-strict architectural structure;

identifying whether each of the plurality of online resources is a non-HyperText Markup Language application;

for each of the plurality of online resources from the non-HyperText Markup Language application, converting the online resource from the non-HyperText Markup Language application to a HyperText Markup Language application;

for each of the plurality of online resources, determining whether the online resource meets a minimum level of content structure to allow an Extensible Style Sheet Transform to be used to convert the online resource to the strict formatted file;

converting each of the plurality of online resources that is determined as meeting the minimum level of content structure to a strict formatted file, wherein the strict formatted file is an Extensible Markup Language application, and wherein data in the first format of the at least one online resource is converted into a strict architectural structure;

converting each of the plurality of online resources that is determined as not meeting the minimum level of content structure to a strict formatted file, wherein the strict formatted file is a document object model of the online resource;

after converting to the strict formatted file, identifying relevant data in the strict formatted file based on the strict architectural structure of the data using an analytic parser;

comparing the identified relevant data to a most recent archived copy of the identified relevant data to determine whether the identified relevant data has been altered; and automatically updating altered identified relevant data to a new archived copy.

* * * * *

UNITED STATES PATENT AND TRADEMARK OFFICE
CERTIFICATE OF CORRECTION

PATENT NO.        : 7,543,024 B2                                      Page 1 of 1
APPLICATION NO. : 09/848987
DATED             : June 2, 2009
INVENTOR(S)       : Holstege It is certified that error appears in the above-identified patent and that said Letters Patent is hereby corrected as shown below:

In column 3, line 17-18, delete "Tranformer" and insert -- Transformer --, therefor.

In column 6, line 57, delete "well-shown" and insert -- well-known --, therefor.

Signed and Sealed this

Eighth Day of June, 2010

David J. Kappos
*Director of the United States Patent and Trademark Office*